Patented Jan. 12, 1943

2,308,246

UNITED STATES PATENT OFFICE 2,308,246

ANTIFREEZING MEDIUM

Herbert S. Polin and Albert I. Nerken, New York,
N. Y., assignors to H. S. Polin Laboratories, Inc.,
a corporation of New York No Drawing. Application June 1, 1939,
Serial No. 276,794

1 Claim. (Cl. 252—77)

This invention relates to improvements in anti-freezing media: particularly liquids with which a substance or agent is mixed to lower the temperature at which the solidification of the liquid normally takes place.

An object of the invention is to provide an anti-freezing medium which is efficient and stable, adapted to withstand the action of a considerable range of temperature without congealing at one extreme, or suffering material loss by evaporation at the other; and containing an anti-freezing agent such that a considerable depression of the freezing point of the liquid can be effected by an ordinary or relatively small quantity of said agent.

Other objects and advantages of the invention are set forth in the following description, which discloses one or more practical forms of the invention, and the novelty is broadly and specifically defined in the appended claim. We of course reserve the right to make changes in details which do not depart from the principle of the invention or go beyond the scope and spirit thereof.

Anti-freezing agents, as the name implies, depress the freezing point of the liquid, such as water, to which they are added. The measure of the depression is proportional to the degree of molecular concentration of the agent in the anti-freezing mixture, but the term molecular concentration now has a rather extended meaning. For example, ionisable substances when dissolved in water split up to give abnormal results when compared to solution in water of corresponding amounts of non-conducting substances. Also some anti-freezing agents are useful due to a phenomenon which really amounts to a concentration that is increased in effect. Among these are substances containing hydroxy (OH) groups; including the alcohols, glycerine, ethylene glycol, etc. These agents apparently become "hydrated," binding to themselves one or more molecules of water. Hence the effective quantity of water in a mixture is decreased, and this of course is equivalent to an increase in the effective concentration of the anti-freezing substance. But for non-ionisable materials, the depression of the freezing point is proportional to the molecular concentration of the anti-freezing agent selected.

Therefore, a given weight of anti-freezing agent will be effective:

1. In proportion to its intrinsic depressing power, which enables certain agents to lower the freezing point to an extent which is virtually constant at predetermined concentrations.

2. In inverse proportion to the molecular weight; that is, the greater this weight, the less will the freezing point be lowered by the same quantity of different anti-freezing substances.

The hydroxy compounds above mentioned are all practical because they have sufficient depressing power, but their molecular weights (with the exception of the alcohols) while fairly low, are not low enough. The alcohols fall short of being the best anti-freezing agents in another respect, that their boiling points are much too low. With an anti-freezing mixture made of water and wood alcohol, for example, there is a great deal of loss due to evaporation when the mixture is employed during the winter season in the cooling water of an internal combustion engine. Furthermore, the alcohols are all of rather low density, and while they will actually lower the freezing point of water to the required point, a relatively large volume to be mixed with the water is necessary.

Up until now, a stable non-volatile anti-freezing medium depending upon an anti-freezing agent of small molecular weight has not been produced. It is the principal aim of this invention to provide an anti-freezing medium or mixture of this nature, which will satisfy the requirements of practical conditions, by means of an agent which prevents the main body of liquid from freezing and has other necessary characteristics, including low molecular weight, so that a relatively small volume thereof will contain a large number of molecules, and will impart to the main body of the liquid the properties desired.

Such an agent must not only have relatively low molecular weight, but also its density must be great enough. It must mix freely with water, and its boiling point must be high so that, when the medium is used for cooling purposes in the engine of a motor vehicle, the anti-freezing agent will not boil off. Generally, a liquid having a molecular structure that is polar in character, or low molecular weight, with the molecules thereof exhibiting high dipole moment or attraction, will answer the purpose, because substances which are characterized by high dipole moment usually have high boiling points and relatively great density also. Suitable for the purpose will be liquids containing polar groups such as oxygen or $NH_2$, $NO_2$, $CO$, $CHO$, $COOH$, etc., of which liquids some would not only be soluble and stable enough, but would also be non-corrosive and non-toxic. Any hydrogen present capable of forming hydrogen bonds would make the agent still more desirable. The vapor tension of such substances is low, and this of course means a high boiling point. Any liquid having these characteristics could be mixed with water to affect the water and move the freezing point down to such level below the normal freezing point as to make it useful for cooling the water of internal combustion engines, and at the same time require a smaller quantity or volume of anti-freezing agent than would be needed to produce the same lowering of the freezing point by means of glycerine or alcohol.

A good example of an anti-freezing substance of this kind is a compound having the structure of the following form:

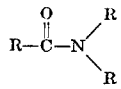

such as formamide. This compound is liquid at ordinary temperatures, has low molecular weight, and a very high boiling point. It mixes very well with water, it is polar in character because of the presence of oxygen and $NH_2$, and its density is considerably greater than water. Hence, as compared with any of the hydroxy compounds, a considerably smaller volume of formamide is required to depress the freezing point of water from 32° F. down through zero. In fact, it is not until about 10° F. below zero is reached that formamide must be used in practically the same amount or volume as other anti-freezing agents mentioned to give equal effect. This is true despite the fact that in some respects, greater molecular concentrations of formamide and water are needed to produce depressions of the freezing point equal to those given by other substances such as glycerine or ethylene glycol, but the combination of the low molecular weight and relatively high density enables the formamide to be used in smaller volume to lower the freezing point of water within the limits above prescribed.

In the following table, $d(t)$ represents the depression of the freezing point of water in degrees C. caused by the addition of one gram molecule of the specified materials to 1,000 grams of water at the concentrations indicated.

*Table I*

| Concentration in gram mols per 1000 gr. $H_2O$ | Formamide | $d(t)$ °C. ethylene glycol | Glycerine |
|---|---|---|---|
| 0.5 | 1.86 | | 1.89 |
| 5.0 | 1.7 | 2.0 | 2.1 |
| 10.0 | 1.4 | 2.1 | 2.0 |
| 20.0 | 1.2 | 2.0 | 2.0 |
| 40.0 | 1.1 | | |

From this table it would appear at first sight that, as compared to ethylene glycol and glycerine, formamide as a freezing agent has less effectiveness, due perhaps to its great tendency to associate.

For example, while 20 gram molecules of formamide may depress the freezing point of 1,000 grams of water about 24° F., 20 gram molecules of ethylene glycol or glycerine will depress the freezing point of the same volume of water much further. But the volume of ethylene glycol or glycerine to equal the effect of formamide in this instance will be larger. The advantage and novel property of formamide for the purpose in view are thus apparent.

In general, and except for the most inert hydrocarbons, organic compounds will react with greater or less speed to the presence of water and/or heat and/or microscopic organisms. Such conditions leading to instability are aggravated in the water-jacket of internal combustion engines. Substances are known, however, which on addition in small quantity to a material or mixture, will inhibit deterioration of that material or mixture. Specifically, the use of formaldehyde is proposed as an inhibitor for the polar compounds above mentioned and for formamide in particular. As an instance of the action of formaldehyde, an aqueous mixture containing formamide will, on standing, develop an odor of ammonia; but a like mixture to which has been added a small percentage (1% to 2%) of formaldehyde exhibits no odor after standing a like period of time. The anti-freezing medium may therefore be left in the radiator of the engine of a motor vehicle in both winter and summer.

The anti-freezing medium herein set forth, while useful in the cooling systems of motor vehicles during the winter season, is by no means restricted, but may be employed in numerous other ways to achieve the ends of this invention.

Having described the invention, what we believe to be new and desirable to secure and protect by Letters Patent of the United States is:

An antifreezing medium comprising water, a quantity of formamide,

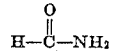

sufficient to produce desired depression of the freezing point of the water, and a small quantity of formaldehyde,

to prevent deterioration of the formamide.

HERBERT S. POLIN.
ALBERT I. NERKEN.